E. J. BROWN.
OPTICAL INSTRUMENT.
APPLICATION FILED JUNE 20, 1910.

987,951.

Patented Mar. 28, 1911.

2 SHEETS—SHEET 1.

E. J. BROWN.
OPTICAL INSTRUMENT.
APPLICATION FILED JUNE 20, 1910.
987,951.
Patented Mar. 28, 1911.
2 SHEETS—SHEET 2.
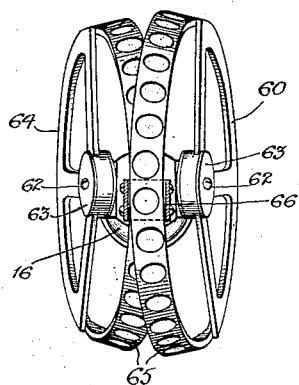
Fig. 3.
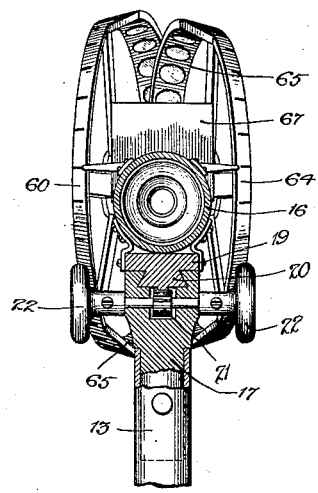
Fig. 4.
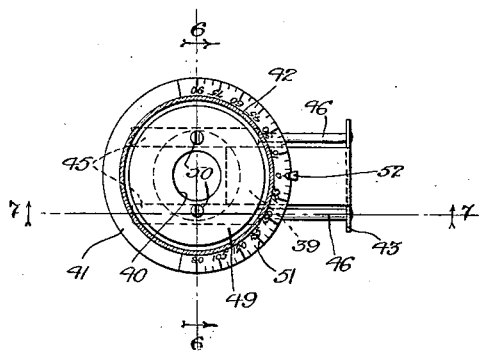
Fig. 5.
Fig. 6.
Fig. 7.
Fig. 8.
Witnesses:—
Inventor:—
Earl J. Brown
By: Fred Gerlach
Atty.

UNITED STATES PATENT OFFICE.

EARL J. BROWN, OF CHICAGO, ILLINOIS, ASSIGNOR TO FRED GERLACH, TRUSTEE, OF CHICAGO, ILLINOIS.

OPTICAL INSTRUMENT.

987,951. Specification of Letters Patent. Patented Mar. 28, 1911.

Application filed June 20, 1910. Serial No. 567,865.

*To all whom it may concern:*

Be it known that I, EARL J. BROWN, a resident of Chicago, in the county of Cook and State of Illinois, have invented certain new and useful Improvements in Optical Instruments, of which the following is a full, clear, and exact description.

In retinoscopy or "shadow tests," it is now common practice to employ a mirror or reflector having a peep-hole therein which is pivotally mounted so it may be rocked or tilted and is rotatably sustained so that the axis about which the mirror tilts, may be varied to correspondingly vary the plane of movement for the determination of refractive errors in eyes.

One of the primary objects of the invention is to provide an improved retinoscope, in which the necessity of tiltably and rotatably mounting the mirror will be avoided, so that any inaccuracies, which might result from variation of the position of the reflector or mirror due to its pivotal and rotatable mounting, will be overcome.

With this object in view the invention provides an improved instrument in which a mirror is held in fixed or definite relation to the eye-piece and the light-supply and the illuminated area is caused to fade across the retina by intercepting the light path. The invention thus provides improved means for retinal illumination in making " shadow tests ", in which the light-supply and mirror may remain in a definite or fixed relation during a test, so that the necessity of mounting the mirror so it may be tilted and so that it may be rotated to angularly vary the axis about which it moves. Therefore, the mirror, when once fixed or adjusted into correct relation with respect to the eye-piece, will remain so and will not vary by reason of any inaccuracy in its mounting or wear of the mirror mounting.

The invention further designs to improve the construction and operation of instruments in retinoscopy and ophthalmoscopy.

The invention consists in the novel features hereinafter set forth and more particularly defined by claims at the conclusion hereof.

Figure 1:
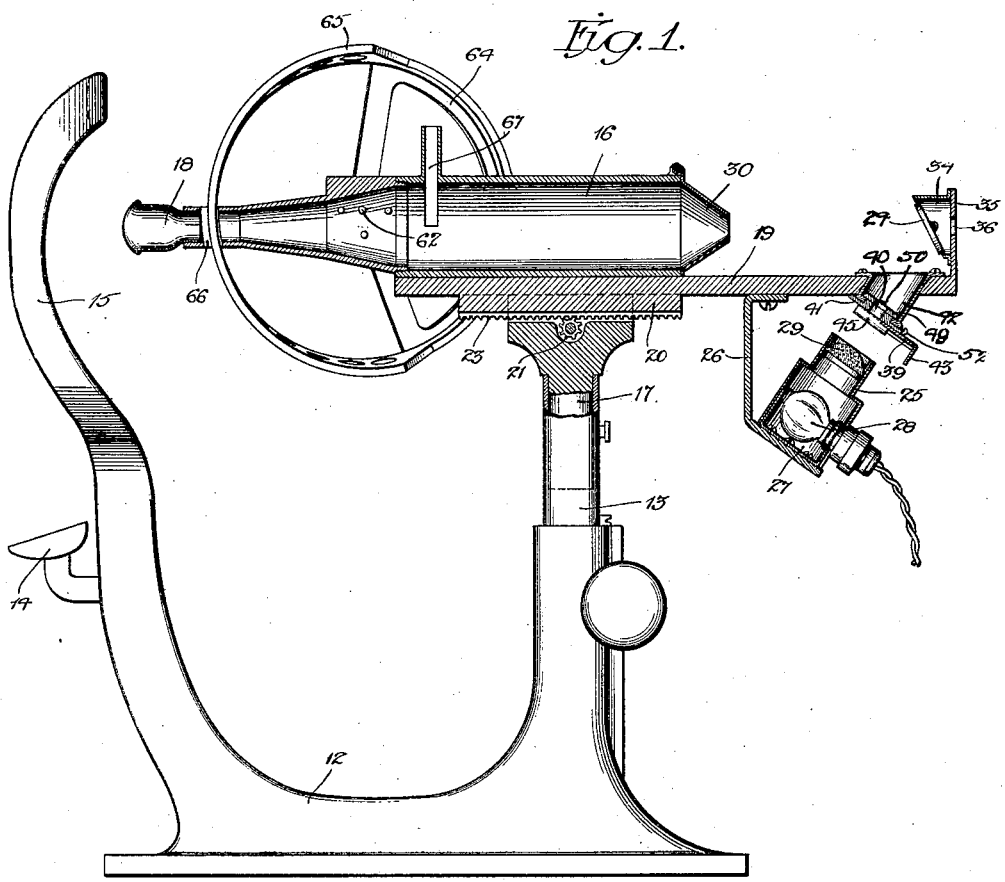
Figure 2:
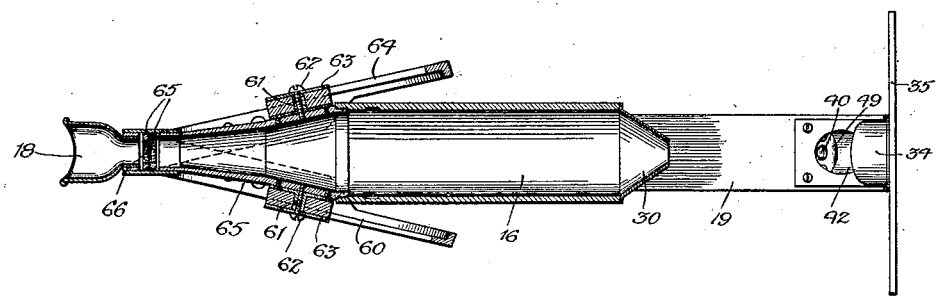

In the drawings: Figure 1 is a view, partly in side elevation and partly in section, of an instrument embodying the invention. Fig. 2 is a horizontal section taken through the center of the focal-tube. Fig. 3 is a front view of the battery of lenses and holders therefor. Fig. 4 is a vertical transverse section through the focal-tube and the supporting standard. Fig. 5 is an inverted plan of the intercepting shutter for sweeping across the light-path to the mirror to vary the area of illumination by the mirror. Fig. 6 is a section taken on line 6—6 of Fig. 5. Fig. 7 is a section taken on line 7—7 of Fig. 5. Fig. 8 is a horizontal section through the mirror.

The improved instrument may be adjustably mounted upon any suitable base or support 12. A post 13 is slidably and adjustably mounted in the base, so that the elevation of the instrument may be varied as desired. At one end, a suitable chin-rest 14 is carried by the frame and a head-support 15 is provided above the chin-rest for the convenience of the patient. A focal-tube 16 is secured to standard 17 which is adjustably mounted in the base, as well understood in the art, so that its elevation may be varied to suit the patient. A suitable eye-piece 18 is mounted in the outer end of the focal-tube 16, this piece being formed to fit snugly around the eye, to exclude light from the outside. A slidable frame or bar 19 is mounted on the post 17, being connected thereto by a dove-tailed rib 20 fitting in a correspondingly shaped groove in the post. A pinion 21 operatively connected to thumb-wheels 22 and journaled in the post, meshes with a rack 23 on the supporting-bar 19 to adjust the latter longitudinally of the focal-tube. Bar 19 serves to support a mirror or reflector 24 and a light-tube 25. A bracket 26 is secured to the under side of bar 19 and has secured thereto a ring 27 around which the light-tube 25 is removably fitted, and a source of light, such as an incandescent lamp 28, is disposed within the light-tube. The latter extends angularly upward to project light onto the mirror 24 and its upper end is provided with a condenser-lens 29.

The mirror 24 is mounted at such angle with respect to the light-supply and the focal-tube, that it will reflect the light-rays through the focal-tube to the eye piece 18 and illuminate the interior of the eye and the retina. A conoidal end-piece 30 cuts off the dispersed light from the focal-tube and has an opening in its rear end for the light rays projected by the mirror. The mirror 24 consists of a plate of glass having its back silvered with the exception of a small central portion and the plate is secured to a metallic disk or holder 31, which is provided with lugs 32 adapted to receive screws 33 for securing the mirror in stationary or definite relation to the light-supply. Screws 33 extend through a shell 34 which is secured to a back-plate 35 which is secured to the bar 19. While these screws secure the mirror in definite relation, they also permit the mirror to be set into correct relation to the eye-piece. Resultantly, the mirror and light-tube are both carried by the adjustable bar 19 and remain in definite relation to one another. Plate 35 is provided with a sight-opening 36 back of a peep-hole 37 formed in the back-plate 31 of the mirror, so that by placing his eye at the side opening 36, the operator can look through the peep-hole 37 and the unsilvered portion of the mirror to examine the eye at the eye-piece 18, on which light will be projected by the mirror.

In shadow tests, refractive errors are detected by causing the light on the retina to fade by varying the angle in which the light is projected to modify the effect on the illuminated area of the retina. In the present invention, it being desired to keep the light-supply and the mirror in definite relation during a test, an intercepting shutter is provided between the light-supply and the mirror which may be quickly manipulated into and out of the light-path to progressively cut the light from the mirror, and to correspondingly affect the illuminated area of the retina onto which the light is projected by the mirror. This shutter consists of a slide 39 mounted to travel across the light-path between the condenser lens 29 and the mirror 24 and across an opening 40 in a revoluble shutter-carrier 41 which is mounted at the lower end of a tube 42 through which the light passes from the light-supply to the mirror. Resultantly, as the slide is moved across opening 40, the light will be progressively cut off from the mirror to correspondingly reduce the illuminated area on the eye. Slide 39 is provided with a finger-piece 43, whereby it may be pushed inwardly to close opening 40 against the force of a pair of springs 44, which are mounted in spring-barrels 45 on the shutter-carrier 41. Rods 46 are secured to the slide on the carrier 41 and engage the springs. A screw 47 serves as an opposing abutment for each of the springs 44. In order to produce the desired effect upon the eye, it is necessary that this slide shall be capable of quick back and forth operation and by providing springs for operating slide in one direction, the illuminated area of the eye, will be progressively increased as the pressure upon the slide is released by the operator. By this means, the slide may be quickly manipulated as desired to produce the shadow effects desired in determining refractive errors of the eye without tilting the mirror. The slide-carrier 41 is rotatably mounted in the end of the tube 42, having a face-plate 41ª which is held against the bottom 48 of tube 42 by a washer 49 and screws 50. Resultantly, the shutter and its carrier may be rotated to cause the shutter to progressively cut off the light-supply in different meridians. A suitable scale 51 is secured to the shutter-carrier 41 so that the angular position of the slide and the meridian across which the light is being cut off or vanishes on the illuminated area of the retina of the eye, will be indicated to the operator.

In operation of the improved retinoscope, the eye of the patient is placed at the eye-piece 18 and the operator places his eye at the sight-opening 36. The light-rays from the light-supply 28 will be directed through opening 40, tube 43 on the carrier 24 onto the mirror, and projected by the mirror through the focal-tube 16 into the retina of the patient's eye at the eye-piece 18. To make a shadow-test, the operator will press the finger-piece 43 of shutter-slide 39 inwardly, which will cause the slide to progressively cut off the light as the shutter obstructs openings 40, thus causing the light rays to be correspondingly cut off from the mirror to illuminate an area corresponding to the position of the slide across opening 40. The shutter will be retracted by springs 44 and cause the illuminated area to progressively increase as the shutter passes into its open position. The shutter may be operated as frequently as desired to produce the desired effect upon the illuminated area of the eye. In order to cause the illuminated area to progressively increase and decrease across different planes, the slide-carrier 41 may be rotated to any angle desired and the meridian in which the shutter is moving and the corresponding meridian at which projected light in the eye will be cut off will be accurately indicated on the scale 51.

The invention thus provides an improved retinoscope, in which the light-supply and mirror may remain in definite fixed relation to each other, while a "shadow test" is being made and the necessity of providing a tiltable and rotatable mirror, likely to affect the accuracy of the test, is avoided, since slight variation due to wear of the parts in a tilting mirror will affect the accuracy of the test, while with the intercepting shutter, the accuracy of the test will not be affected.

The improved instrument may also be used as an ophthalmoscope and for this purpose a strong plus lens is inserted in the focal-tube at 67 and a battery of lenses to correct the amathropia, when used as a retinoscope or ophthalmoscope, is provided. In instruments of this character, it is desirable that the patient's eye should be directed to a straight distant object and not obstructed by some part of the instrument. For this purpose a rotatable lens-carrier is mounted at each side of the focal-tube to rotate in a plane as nearly as possible parallel to the axis of the focal-tube. A lens-carrier 60 is journaled on a stud 61 projecting laterally from the focal-tube and is held on the stud by a screw 62 and a friction-washer 63, which frictionally holds the lens-carrier in assigned position. At the other side of the focal-tube, a similar lens-carrier 64 is similarly mounted. Each of these lens-carriers is provided with an inwardly extending flange or wall 65 in which the lenses are held to extend transversely to the axis of the focal-tube and these flanges are adapted to travel through an opening 66 in the tube adjacent the eye-piece 18. By rotating the lens-carriers, any lens of the battery may be brought into the focal-tube and usually one of the openings in the flange of each lens-carrier is not provided with a lens, so that the instrument may be used as an ophthalmoscope without any lens of the battery being interposed in the light path between the patient's eye and the mirror. A suitable opening 67 is formed in the top of the focal-tube through which an object-lens may be inserted to form an image of the retina of the eye. The instrument thus provides improved means for adjustably carrying a battery of lenses which does not interfere with the view of the free eye of the patient.

The invention is not to be understood as restricted to the details shown and described, since these may be modified within the scope of the appended claims, without departing from the spirit and scope of the invention.

Having thus described the invention, what I claim as new and desire to secure by Letters Patent, is:

1. In an optical instrument, the combination of a light-supply, a mirror for projecting light from the supply, and means mounted to move across the light-path to progressively vary the area of the eye illuminated by the mirror.

2. In an optical instrument, the combination of a light-supply, a mirror for projecting light from the supply, and means mounted to move across the light-path to progressively vary the area of the eye illuminated by the mirror while the light-supply and mirror are in fixed relation to each other.

3. In an optical instrument, the combination of a light-supply, a mirror for projecting light from the supply, and rotatably supported means mounted to move across the light-path to progressively vary the area of the eye illuminated by the mirror.

4. In an optical instrument, the combination of a light-supply, a mirror for projecting light from the supply, and rotatably supported means mounted to move across the light-path to progressively vary the area of the eye illuminated by the mirror while the mirror and light-supply remain in relatively fixed relation to each other.

5. In an optical instrument, the combination of a light-supply, a mirror for projecting light from the supply, and means mounted to move across the light-path between the supply and the mirror to progressively vary the area of the eye illuminated by the mirror.

6. In an optical instrument, the combination of a light-supply, a mirror for projecting light form the supply, and means mounted to move across the light-path between the supply and the mirror, to progressively vary the area of the eye illuminated by the mirror while the light-supply and mirror are in fixed relation to each other.

7. In an optical instrument, the combination of a light-supply, a mirror for projecting light from the supply, and rotatably supported means mounted to move across the light-path between the supply and the mirror, to progressively vary the area of the eye illuminated by the mirror.

8. In an optical instrument, the combination of a light-supply, a mirror for projecting light from the supply, and rotatably supported means mounted to move across the light-path between the supply and the mirror, to progressively vary the area of the eye illuminated by the mirror while the mirror and light-supply remain in relatively fixed relation to each other.

9. In an optical instrument, the combination of a light-supply, a mirror for projecting light from the supply, and a shutter slidably mounted to move back and forth across the light-path, to progressively vary the area of the eye illuminated by the mirror.

10. In an optical instrument, the combination of a light-supply, a mirror for projecting light from the supply, and a shutter slidably mounted to move back and forth across the light-path, to progressively vary the area of the eye illuminated by the mirror while the light-supply and mirror are in fixed relation to each other.

11. In an optical instrument, the combination of a light-supply, a mirror for projecting light from the supply, a shutter mounted to move back and forth across the light-path to progressively vary the light of the eye illuminated by the mirror, and a rotatable support on which the shutter is mounted.

12. In an optical instrument, the combination of a light-supply, a mirror for projecting light from the supply, a shutter mounted to move back and forth across the light-path to progressively vary the area of the eye illuminated by the mirror while the mirror and light-supply remain in relatively fixed relation to each other, and a rotatable support on which the shutter is mounted.

13. In an optical instrument, the combination of a light-supply, a mirror for projecting light from the supply, and a shutter slidably mounted to move back and forth across the light-path between the supply and the mirror, to progressively vary the area of the eye illuminated by the mirror.

14. In an optical instrument, the combination of a light-supply, a mirror for projecting light from the supply, and a shutter slidably mounted to move back and forth across the light-path between the supply and the mirror, to progressively vary the area of the eye illuminated by the mirror while the light supply and mirror are in fixed relation to each other.

15. In an optical instrument, the combination of a light-supply, a mirror for projecting light from the supply, a shutter mounted to move back and forth across the light-path between the supply and the mirror, to progressively vary the area of the eye illuminated by the mirror, and a rotatable support on which the shutter is mounted.

16. In an optical instrument, the combination of a light-supply, a mirror for projecting light from the supply, a shutter mounted to move back and forth across the light-path between the supply and the mirror, to progressively vary the area of the eye illuminated by the mirror, while the mirror and light supply remain in relatively fixed relation to each other, and a rotatable support on which the shutter is mounted.

17. In an optical instrument, the combination of a light-supply, a mirror for projecting light from the supply, rotatably supported means mounted to move across the light-path to progressively vary the area of the eye illuminated by the mirror, and means for indicating the meridian in which said means moves across the light-path.

18. In an optical instrument, the combination of a light-supply, a mirror for projecting light from the supply, a shutter slidably mounted to move back and forth across the light-path to progressively vary the area of the eye illuminated by the mirror, a rotatable support on which the shutter is mounted, and means for indicating the angular position of the shutter.

19. In an optical instrument, the combination of a light-supply, a mirror for projecting light from the supply, means mounted to move across the light-path to progressively vary the area of the eye illuminated by the mirror, and a spring for operating said means in one direction.

20. In an optical instrument, the combination of a light-supply, a mirror for projecting light from the supply, a shutter mounted to move across the light-path between the supply and the mirror, to progressively vary the area of the eye illuminated by the mirror, a rotatable support on which the shutter is mounted, and a spring for operating said shutter in one direction.

21. In an optical instrument, the combination of a light-supply, a mirror for projecting light from the supply, a light-tube extending angularly downward from the mirror, and means mounted to move across the light-path to progressively vary the area of the eye illuminated by the mirror.

22. In an optical instrument, the combination of a light-supply, a mirror for projecting light from the supply, a light-tube extending angularly downward from the mirror, and a shutter mounted to move back and forth across the path of light passing through said tube.

23. In an optical instrument, the combination of a light-supply, a mirror for projecting light from the supply, a light-tube extending angularly downward from the mirror, a shutter mounted to move back and forth across the path of light passing through said tube, and a rotatable support for the shutter.

24. In an optical instrument, the combination of a supporting-frame, a focal-tube, an eye-piece at one end of said tube, rotatable lens-carriers having their axes extending laterally and outwardly with respect to the focal-tube at such angles that they will be in close proximity to the tube, inwardly extending means on the carriers respectively for holding lenses in over-lapping relation and in operative relation to the focal-tube, the latter extending between the carriers and substantially to the lens-holding means, and inwardly extending means for the carriers connected to the focal-tube between them.

EARL J. BROWN.

Witnesses:
FRED GERLACH,
HILDEN C. PETERSEN.

---

Copies of this patent may be obtained for five cents each, by addressing the "Commissioner of Patents, Washington, D. C."